US011861166B2

(12) United States Patent
Glimcher

(10) Patent No.: US 11,861,166 B2
(45) Date of Patent: Jan. 2, 2024

(54) SYSTEM AND METHOD FOR NETWORK INTERFACE CONTROLLER BASED DATA DEDUPLICATION

(71) Applicant: Dell Products L.P., Round Rock, TX (US)

(72) Inventor: Boris Glimcher, Tel Aviv-Jaffa (IL)

(73) Assignee: Dell Products L.P., Round Rock, TX (US)

( * ) Notice: Subject to any disclaimer, the term of this patent is extended or adjusted under 35 U.S.C. 154(b) by 53 days.

(21) Appl. No.: 17/723,022

(22) Filed: Apr. 18, 2022

(65) Prior Publication Data

US 2023/0333736 A1 Oct. 19, 2023

(51) Int. Cl.
*G06F 3/06* (2006.01)

(52) U.S. Cl.
CPC ............ *G06F 3/0604* (2013.01); *G06F 3/067* (2013.01); *G06F 3/0655* (2013.01)

(58) Field of Classification Search
CPC ....... G06F 3/0604; G06F 3/0655; G06F 3/067
See application file for complete search history.

(56) References Cited

U.S. PATENT DOCUMENTS

| 11,775,396 B1* | 10/2023 | Bharadwaj | G06F 11/1464 |
| | | | 714/4.11 |
| 2005/0243609 A1* | 11/2005 | Yang | G06F 3/0617 |
| | | | 365/189.05 |
| 2018/0081561 A1* | 3/2018 | Todd | G06F 11/1453 |
| 2018/0090184 A1* | 3/2018 | Lee | G11C 29/20 |
| 2019/0129639 A1* | 5/2019 | Armangau | G06F 16/137 |
| 2019/0212934 A1* | 7/2019 | Chopra | G06F 3/0604 |
| 2020/0012440 A1* | 1/2020 | Wang | H04L 67/1097 |
| 2022/0206964 A1* | 6/2022 | Kim | G06F 13/107 |
| 2022/0269657 A1* | 8/2022 | Sanders | G06F 3/0641 |

* cited by examiner

*Primary Examiner* — Jeong S Park
(74) *Attorney, Agent, or Firm* — Womble Bond Dickinson (US) LLP

(57) ABSTRACT

Methods and systems for managing storage of data in a distributed system is disclosed. To manage storage of data in a distributed system, a data processing system may include a network interface controller (NIC). The NIC may present emulated storages that may be used for data storage. The emulated storage devices may utilize storage resources of storage devices. The NIC and the storage devices may implement a distributed deduplication process. The NIC may segment data into chunks and obtain fingerprints of the chunks. The fingerprints may be provided to the storage which may check the fingerprints against fingerprints of already stored chunks. The storage may request the chunks corresponding to the fingerprints that did not match any fingerprints of the already stored chunks. The NIC may provide only those requested chunks to the storage before discarding all of the chunks.

20 Claims, 5 Drawing Sheets

SYSTEM AND METHOD FOR NETWORK INTERFACE CONTROLLER BASED DATA DEDUPLICATION

FIELD OF THE DISCLOSED EMBODIMENTS

Embodiments disclosed herein relate generally to data storage. More particularly, embodiments disclosed herein relate to systems and methods for network interface controller based deduplication and storage.

BACKGROUND

Computing devices may store data and used stored data. For example, computing devices may utilize data when providing computer implemented services. Different computing devices may perform similar and/or different functions. The components of computing devices may generate data that may be relevant to future operations. The data may be used during the future operations.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
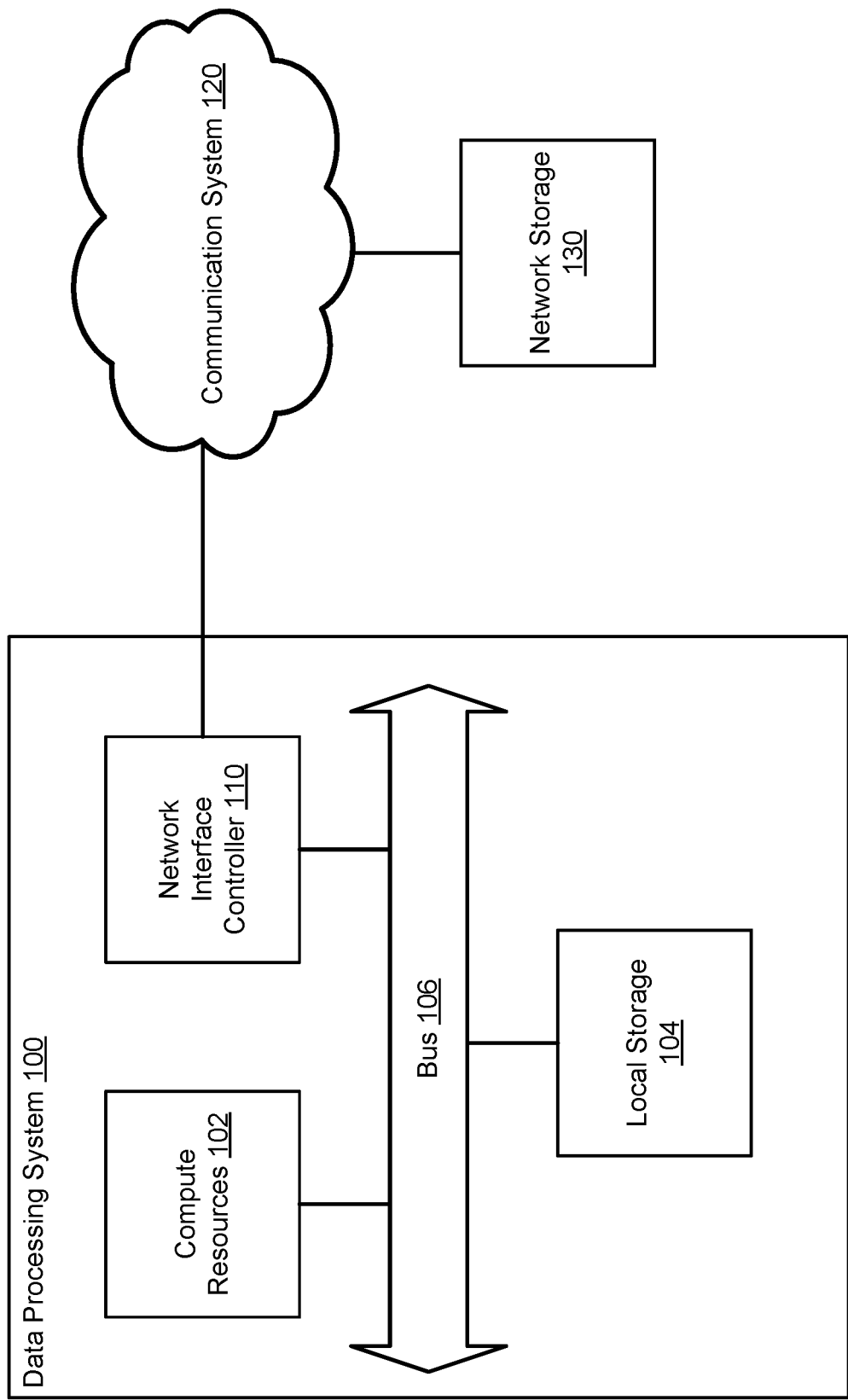
FIG. 1 shows a block diagram illustrating a data processing system in accordance with an embodiment.

Various embodiments and aspects disclosed herein will be described with reference to details discussed below, and the accompanying drawings will illustrate the various embodiments. The following description and drawings are illustrative of the embodiments disclosed herein and are not to be construed as limiting the embodiments disclosed herein. Numerous specific details are described to provide a thorough understanding of various embodiments of embodiments disclosed herein. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment disclosed herein. The appearances of the phrase "in one embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing storage of data in a distributed system. To manage storage of data in a distributed system, a data processing system may include a network interface controller (NIC). The network interface controller may present emulated storages that may be used for data storage. The emulated storage devices may utilize storage resources of storage devices.

To improve the quantity of data that may be stored in the storage devices, the NIC and the storage devices may implement a distributed deduplication process. The NIC may segment data into chunks and obtain fingerprints of the chunks. The fingerprints may be provided to the storage which may check the fingerprints against fingerprints of already stored chunks. The storage may request the chunks corresponding to the fingerprints that did not match any fingerprints of the already stored chunks. The NIC may provide only those requested chunks to the storage before discarding all of the chunks.

By doing so, the quantity of data transmitted between the NIC and storage may be reduced. Consequently, in a scenario in which the NIC is connected to the storage via a network, network bandwidth may be conserved.

In an embodiment, a computer-implemented method for managing data storage in a distributed system is provided. The method may include obtaining, by a Network Interface Controller (NIC) of a data processing system, data for storage; segmenting, by the NIC, the data into chunks; obtaining, by the NIC, fingerprints for the chunks; providing, by the NIC, batches of the fingerprints to a storage; providing, by the NIC and to the storage for storage, a first portion of the chunks corresponding to a first portion of the fingerprints that are new; and discarding, by the NIC, the chunks without providing to the storage a second portion of the chunks corresponding to a second portion of the fingerprints that are not new.

The storage may be operably connected to the NIC via a network, and the data is obtained from compute resources of the data processing system via a bus of the data processing system.

The computer-implemented method may also include presenting an emulated storage device to the compute resources, the data may be obtained via communication over the bus, the communication being directed to the emulated storage device.

The compute resources may believe that the data is stored in a storage directly connected to the bus.

The computer-implemented method may further include determining communication characteristics (e.g., latency, available bandwidth, maximum transmission unit size, etc.) of a connection between the NIC and the storage via the network; and identifying a batch size based on the communication characteristics. Providing the batches may include obtaining a batch of the batches based on the identified batch size.

Obtaining the batch may include adding a portion of the fingerprints to the batch so that the batch has a size substantially similar to the identified batch size.

Obtaining the fingerprints may include obtaining hashes for the chunks, the hashes being used as the fingerprints, and a hash function used to obtain the hashes being substantially collision free.

Obtaining the hashes for the chunks may include sending the chunks to a communication security processor of the NIC; and receiving the hashes from the communication security processor.

Providing the first portion of the chunks may include obtaining, from the storage, indications that the first portion of the fingerprints that are new; and using the indications to select the first portion of the chunks.

The indications may be received from the storage in a response batch that is responsive to a batch of the batches of the fingerprints provided to the storage.

A non-transitory media may include instructions that when executed by a processor cause the computer-implemented method to be performed.

A data processing system may include the non-transitory media and a processor (e.g., of a NIC), and may perform the computer-implemented method when the computer instructions are executed by the processor.

Turning to FIG. 1, a block diagram illustrating a system in accordance with an embodiment is shown. The system shown in FIG. 1 may facilitate performance of workloads (e.g., computer-implemented workloads performed by executing computing instructions with at least one processor of one or more data processing systems). The system may include to data processing system 100.

To perform the workloads, data processing system 100 may provide computer implemented services to users and/or other computing devices operably connected to data processing system 100. The computer implemented services may include any type and quantity of services including, for example, database services, instant messaging services, video conferencing services, etc. Different systems may provide similar and/or different computer implemented services.

To provide the computer implemented services, data processing system 100 may include various hardware resources such as compute resources 102, local storage 104, network interface controller (NIC) 110, and bus 106. Compute resources 102 may include hardware devices such as processors, memory modules, etc. Local storage 104 may include storage devices such as hard disk drives, solid state drives, storage controller, etc. NIC 110 may facilitate communication with other remote devices. For example, NIC 110 may facilitate communication with network storage 130. Any of the components of data processing system 100 may be operably connected to one another and/or other components (not shown) via bus 106.

When providing the computer implemented services, data may be stored for future use in local storage 104 and/or remote storage devices such as network storage 130 (and/or other remote storages). To facilitate use of network storage 130 (and/or other remote or local storages), MC 110 may present an emulated storage (e.g., by presenting an emulated storage endpoint) to compute resources 102 via bus 106. Consequently, compute resources 102 may direct access requests (e.g., storage, read, delete) for the emulated storage to NIC 110 via bus 106.

To implement the emulated storage, NIC 110 may use the storage resources of network storage 130 (and/or other remote or local storage devices operably connected to it). For example, network storage 130 may also include a NIC (not shown) that may include functionality to secure, format, and use storage resources local to network storage 130. When an access request for the emulated storage is received by NIC 110, NIC 110 may use translation tables, lookup tables, and/or implement various procedures for servicing the access request via network storage 130. However, from the perspective of compute resources 102, the emulated storage may appear to be a bare metal device operably connected to compute resources 102 via bus 106. Compute resources 102 may be unaware of network storage 130 and/or the processes performed by NIC 110 to service access requests.

Due to the distributed nature of the system illustrated in FIG. 1, storing data in the emulated storage device may consume network bandwidth if the to-be-stored data is transmitted by NIC 110 to network storage 130 via communication system 120. Further, the condition of the operable connection between NIC 110 and network storage 130 may impact the quality of the storage services provided by the emulated storage device. For example, network churn or other issues with communication system 120 may introduce latency, periods where communication between NIC 110 and network storage 130 is not possible, etc.

In general, embodiments disclosed herein relate to systems, methods, and devices for managing data storage in a distributed system. To manage data storage in a data processing system, NIC 110 may perform deduplication for data to be stored in an emulated storage that it presents to other device. As used herein, deduplication may refer to a process of avoiding storage of redundant data while ensuring that copies of unique data are stored. Various data structures may be reconstructed using the stored unique data.

For example, to deduplicate data, the system of FIG. 1 may (i) segment the data into chunks, (ii) obtain fingerprints for the chunks, (iii) compare the fingerprints for the chunks to fingerprints of other chunks that are already stored, (iv) store the portions of the chunks corresponding to a portion of the fingerprints that do not match the fingerprints of the other chunks that are already stored, (v) discard the chunks without storing a second portion of the chunks corresponding to a second portion of the finger prints that do match the fingerprints of the other chunks that are already stored, and/or (v) update counts and/or recipes usable to determine when a stored chunk may be deleted without negatively impacting data reconstruction using stored chunks and reconstruct data using the stored chunks, respectively. To provide for deduplication, the responsibilities for performing these processes may be divided across the components of FIG. 1

In an embodiment, NIC 110 is responsible for obtaining chunks and fingerprints for the chunks while network storage 130 may be responsible for identifying whether any of the fingerprints are new and storing fingerprints corresponding to the identified fingerprints. By doing so, NIC 110 may only need to send the fingerprints for the chunks and the chunks associated with new fingerprints to network storage 130. In such a scenario, network storage 130 may store fingerprints and/or metadata (e.g., reference counts). To identify whether a chunk may need to be stored, network storage 130 may receive a corresponding fingerprint, compare it to fingerprints of stored chunks, and request the chunk if the fingerprint does not match the fingerprints of stored chunks. Consequently, the communication bandwidth used for data storage may be reduced when compared to relying on network storage 130 to perform all of the deduplication process, including fingerprint generation.

In an embodiment, NIC 110 is responsible for obtaining chunks and fingerprints for the chunks, and identifying new fingerprints, while network storage 130 may be responsible for storing fingerprints corresponding to the new fingerprints. By doing so, NIC 110 may only need to send the chunks associated with the new fingerprints to network storage 130. In such a scenario, NIC 110 may store fingerprints and/or metadata (e.g., reference counts). Network storage 130 may also maintain a copy of the metadata (e.g., reference counts) to identify when stored chunks are no longer needed (e.g., for reconstruction). Consequently, the communication bandwidth used for data storage may be reduced when compared to relying on network storage 130 to perform all of the deduplication process, including fingerprint generation or new fingerprint identification.

By doing so, embodiments disclosed herein may facilitate deduplicated storage of data with reduced use of communication bandwidth (e.g., when compared to scenarios in which only remote entities are responsible for deduplication).

NIC 110 may be implemented with a hardware devices and/or software components hosted by the hardware devices. In an embodiment, NIC 110 is implemented using a hardware device including circuitry. The hardware device may be, for example, a digital signal processor, a field programmable gate array, system on a chip, or an application specific integrated circuit. The circuitry may be adapted to cause the hardware device to perform the functionality of NIC 110. NIC 110 may be implemented using other types of hardware devices without departing embodiment disclosed herein.

In one embodiment, NIC 110 is implemented using a processor adapted to execute computing code stored on a persistent storage that when executed by the processor performs the functionality of NIC 110 discussed throughout this application. The processor may be a hardware processor including circuitry such as, for example, a central processing unit, a processing core, a part of a system on a chip or other type of special purpose hardware device, or a microcontroller. The processor may be other types of hardware devices for processing information without departing embodiment disclosed herein.

Generally, NIC 110 may include functionality to process network data units such as packets. Packets may be exchanged with communication system 120, and devices operably connected to communication system 120 such as network storage 130. In the context of storage, when NIC 110 obtains access requests that will result in access requests being directed to network storage 130, NIC 110 may perform part of the data deduplication process, and cooperate with the remote storage. The communications between NIC 110 and networks storage 130 may be encapsulated to obtain packets, and directed between network storage 130 and NIC 110 via communication system 120. Network storage 130 may include similar functionality to provide for transmission of access requests, fingerprints, chunks, etc.

Bus 106 may be implemented with one or more communication buses. The communications buses may support various communications standards. In an embodiment, bus 106 comprises a Peripheral Component Interconnect Express (PCIE) bus which connects compute resources 102 to NIC 110. NIC 110 may comply with the Non-Volatile Memory Express (NVMe) specification and support NVME communications.

NIC 110 may also support, NVME over fabric (NVMe-oF) communications (or other communication standards) and may communicate with network storage 130 and/or other local storage devices using NVMe-oF communications.

To support NVMe communications, NIC 110 may include functionality to present endpoints (e.g., to other devices), establish initiators to facilitate communications between endpoints and the initiators, and/or implement other methods for communicating via bus 106, communication system 120, and/or other communications facilitates not illustrated in FIG. 1.

Figure 2:
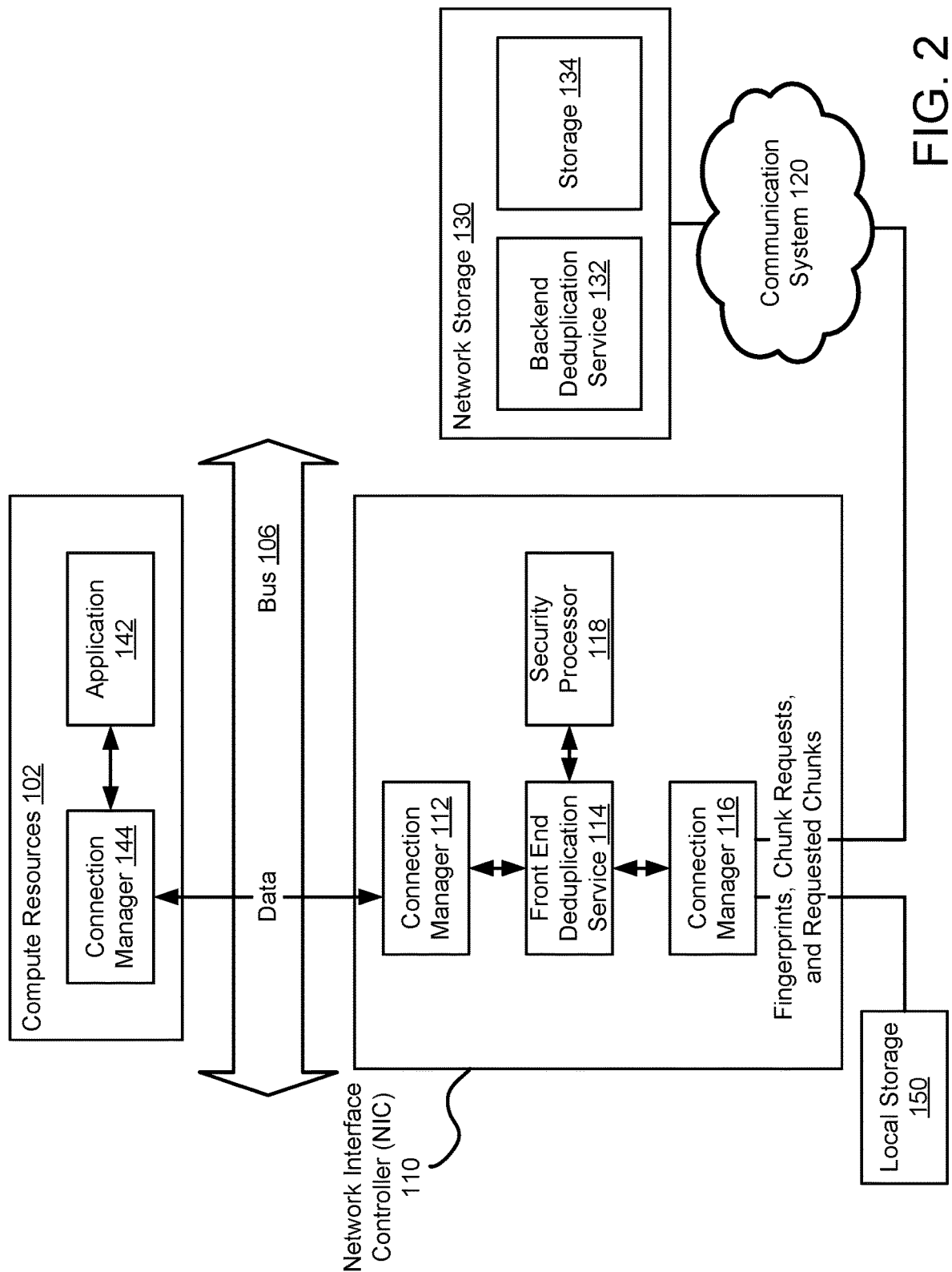
FIG. 2 shows a block diagram illustrating a network interface controller in accordance with an embodiment.

Refer to FIG. 2 for additional details regarding NIC 110.

Network storage 130 may be implemented using, for example, a network attached storage system. The network attached storage system may include functionality to perform a part of the deduplication process to facilitate storage of deduplicated data. As part of that process, network storage 130 may store metadata such as reference counts (e.g., numbers of times a fingerprint for a chunk has been countered) and/or recipes (e.g., stored chunk identifiers, instructions for combining the chunks to obtain previously stored data) for reconstructing data using stored chunks.

In an embodiment, communication system 120 includes one or more networks that facilitate communication between any number of components. The networks may include wired networks and/or wireless networks (e.g., and/or the Internet). The networks may operate in accordance with any number and types of communication protocols (e.g., such as the internet protocol). Communication system 120 may include packetized communication.

To convey information via communication system 120, data structures (e.g., payloads) may be encapsulated (e.g., packetized) with control information compliant with the communication schemes supported by communication system 120. For example, communication system 120 may include the Internet and support internet protocol communications.

Any of data processing system 100, NIC 110, and network storage 130 may be implemented with a computing device such as a host or server, a personal computer (e.g., desktops, laptops, and tablets), a "thin" client, a personal digital assistant (PDA), a Web enabled appliance, embedded computing device such as a system on a chip, a mobile phone (e.g., Smartphone), and/or any other type of computing device or system. For additional details regarding computing devices, refer to FIG. 4.

While illustrated in FIG. 1 as including a limited number of specific components, a system in accordance with an embodiment may include fewer, additional, and/or different components than those illustrated therein.

As discussed above, NIC 110 may facilitate deduplicated data storage in storage devices separate from data processing system 100. Turning to FIG. 2, a diagram of NIC 110 in accordance with an embodiment is shown. As discussed above, data processing system 100 may utilize NIC 110 for storage purposes. To do so, NIC 110 may present an emulated storage device to data processing system. Data processing system 100 may send communications, compliant with the emulated data processing system, to NIC 110 over bus 106 to have access requests for the emulated storage device be serviced.

To communicate with NIC, data processing system 100 may host connection manager 144. Connection manager 144 may generate access requests based on requests from applications 142 (and/or other entities hosted by data processing system 100), encapsulate them as necessary to comply with the communication scheme supported by bus 106, and transmit the encapsulated access request to an emulated storage device endpoint presented by NIC 110. In the context of data storage, the access request may include the data to be stored in the emulated storage.

Connection manager 144 may, in the context of NVMe communications, be implemented with an NVMe initiator. The NVMe initiator may be implemented with a driver or other piece of software for sending communications via bus 106. Applications 142 and connection manager 144 may execute via compute resources 102. While not shown in FIG. 2, data processing system 100 may host an operating system (e.g., which may include connection manager 144) that mediates presentation of storage to applications 142.

To present the emulated storage device endpoint to compute resources 102, NIC 110 may host connection manager 112. Connection manager 112 may present emulated storage device endpoints to other devices, such as data processing system 100. Connection manager 112 may present any number of such emulated endpoints. By doing so, NIC 110 may present any number of emulated storage devices to the compute resources of data processing system 100.

When communications are received by connection manager 112, the connection manager may identify a target emulated storage device and initiate processing of the access requests based on the target. For example, connection manager 112 may pass the access requests to front end deduplication service 114 which may perform a portion of the deduplication process on the data (as noted above, the storage device may also perform some of the deduplication process). The processes may result in the generation of (i) chunks and (ii) fingerprints.

In an embodiment, front end deduplication service 114 leverages security processor 118 to obtain the fingerprints. Security processor 118 may be an onboard processor adapted for communication security and may include functionality to perform various hashes on data structures. For example, security processor 118 may be implemented with a special purposes circuit, companion chip, special purpose processing core, or other piece of hardware that may execute hash functions efficiently. Generally, security processor 118 may be used for communication security, which may also utilize hashes or other type of one-way functions useful in cryptographic systems. The hash generation functionality of security processor 118 may be leveraged to efficiently generate hashes of chunks to obtain fingerprints for the chunks.

The chunks (all or a portion) and/or fingerprints may be provided to connection manager 116 which may encapsulate and send the encapsulated fingerprints/chunks to storage devices such as network storage 130, local storage 150, or other storage devices not illustrated herein. The manner of encapsulation of the processed access requests may correspond to the communication medium over which the encapsulated fingerprints/chunks are transmitted. For example, if local storage 150 is operably connected via a PCIe link, then connection manager 116 may encapsulate according to the PCIe standard. Likewise, access requests directed to network storage 130 may be encapsulated for internet protocol based communications.

In an embodiment, fingerprints are sent in batches to network storage 130 (or other storages). For example, connection manager 116 may monitor the connectivity to network storage 130, aggregate fingerprints until a sufficient quantity are obtained, and send the aggregated fingerprints in a batch to network storage 130. Similarly, network storage 130 may send requests for chunks in batches (e.g., responsive or associated with corresponding batches of fingerprints) as well.

Connection manager 116 may be implemented with, for example, a PCIe initiator, NVMe-oF initiator, and/or other communication protocol compliant initiators to facilitate communications between NIC 110 and storage devices. Any of connection manager 112 and connection manager 116 may be implemented with, for example, a driver or other type of application.

When deciding where to direct access requests and how to process them, connection manager 116 may utilize lookup tables or other types of data structures that may relate to which emulated storage device an access request is directed to how the access requests are to be processed and where corresponding fingerprints/chunks are to be sent. The data included in the lookup tables may be set by an administrator, may be set by a control plane that may manage NIC 110, and may be dynamically updated over time to provide different qualities of storage service.

In an embodiment, bus 106 is implemented as a PCIe bus. In such a scenario, the functionality of connection manager 112 may be implemented using a PCIe chipset hosted by NIC 110. The chipset may support both physical and virtual functions. The virtual functions may be used to manage presentation of any number of emulated storage devices. The physical and virtual functions may handle protocol specific requirements such as error handling, doorbells, interrupts, and/or other aspects of sending and receiving information via a physical bus.

In an embodiment, any of connection manager 112, front end deduplication service 114, connection manager 116, and security processor 118 is implemented using a hardware device including circuitry. The hardware device may be, for example, a digital signal processor, a field programmable gate array, system on a chip, or an application specific integrated circuit. The circuitry may be adapted to cause the hardware device to perform the functionality of connection manager 112, front end deduplication service 114, connection manager 116, and/or security processor 118. Connection manager 112, front end deduplication service 114, connection manager 116, and/or security processor 118 may be implemented using other types of hardware devices without departing embodiment disclosed herein.

In one embodiment, any of connection manager 112, front end deduplication service 114, connection manager 116, and security processor 118 is implemented using a processor adapted to execute computing code stored on a persistent storage that when executed by the processor performs the functionality of connection manager 112, front end deduplication service 114, connection manager 116, and/or security processor 118 discussed throughout this application. The processor may be a hardware processor including circuitry such as, for example, a central processing unit, a processing core, or a microcontroller. The processor may be other types of hardware devices for processing information without departing embodiment disclosed herein.

Figure 3A:
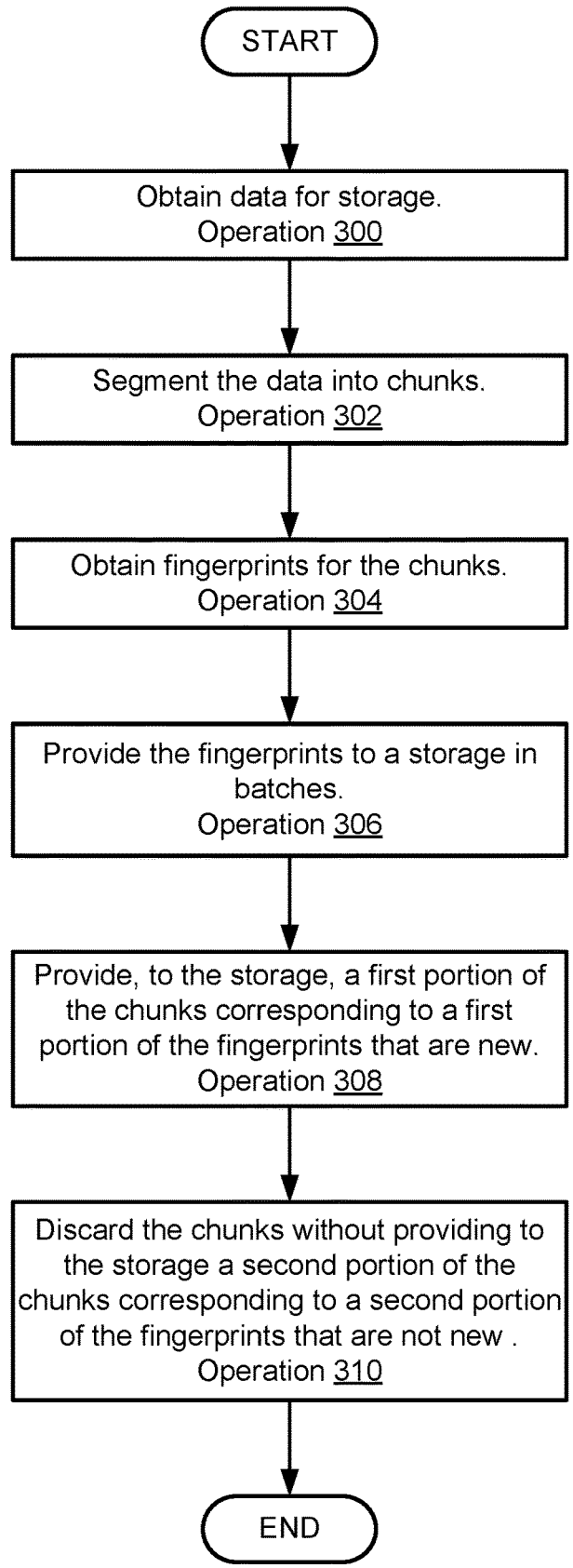
FIG. 3A shows a flow diagram illustrating a method of storing data in accordance with an embodiment.
Figure 3B:
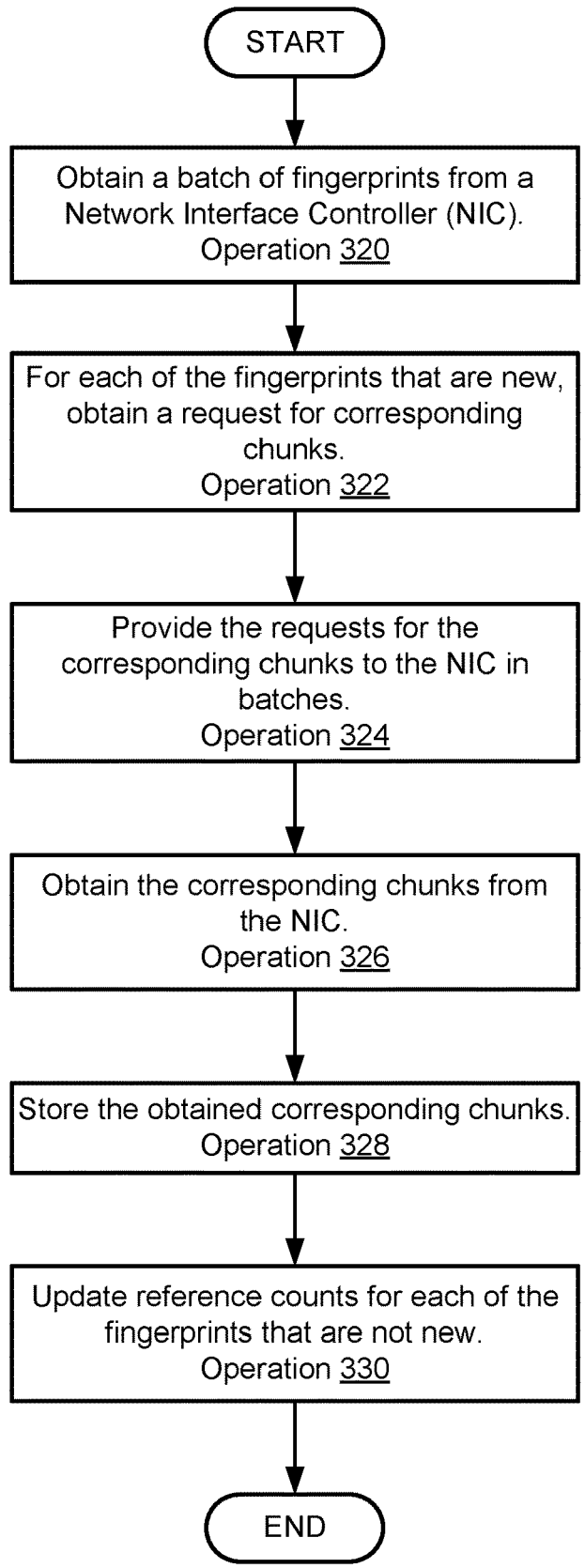
FIG. 3B shows a flow diagram illustrating a method of storing data in accordance with an embodiment.

Connection manager 112, front end deduplication service 114, connection manager 116, and/or security processor 118 may perform all, or a portion, of the methods illustrated in FIGS. 3A-3B.

While illustrated in FIG. 2 with a limited number of specific components, a NIC may include additional, fewer, and/or different components without departing from embodiments disclosed herein.

As discussed above, the components of FIG. 1 may perform various methods to store data. FIGS. 3A-3B illustrates examples of methods that may be performed by the components of FIG. 1 when providing their functionalities. In the diagrams discussed below and shown in FIGS. 3A-3B, any of the operations may be repeated, performed in different orders, and/or performed in a parallel with other operations and/or a partially overlapping in time manner with other operations.

Turning to FIG. 3A, a flow diagram illustrating a method of storing data in accordance with an embodiment is shown. The method may be performed by a NIC, a data processing system, a storage, and/or other components.

At operation 300, data for storage is obtained. The data for storage may be obtained from compute resources. The data may be part of an access request directed to an emulated storage device presented by a NIC to the compute resources.

At operation 302, the data is segmented into chunks. The data may be segmented using any segmentation technique.

In an embodiment, the data is segmented based on blocks included in the data. The blocks may be used as the chunks. Any number of chunks may be obtained. The data may be duplicative, in part or entirely, of data stored in a storage used by the NIC to provide the functionality of the emulated storage.

At operation 304, fingerprints for the chunk are obtained. The fingerprints may be obtained by generating hashes of the chunks. The hashes may be generated using a security processor, or may be generated using a general purpose processor and corresponding algorithm. The hash may be substantially collisions free so that it is unlikely that fingerprints generated for two fingerprints that have different bit sequence result in the same hash value. In an embodiment, the hash is collision free. For example, a perfect hash function may be used to generate the hashes.

At operation 306, the fingerprints are provided to a storage in batches. To provide the fingerprints to the storage, fingerprints may be aggregated until the size and/or number of aggregated fingerprints reaches a threshold. The threshold may be set or may vary depending on the quality of the connection (e.g., via network) between the NIC and the storage utilized by the NIC. For example, characteristics of the connection such as latency and available bandwidth may be evaluated. As the connection characteristics improve (e.g., lower latency, higher bandwidth), the threshold may be reduced.

In an embodiment, fingerprints are aggregated until the aggregated fingerprints are of a size that is similar to (but smaller than) that of the maximum network data unit size supported by a network used to transmit the fingerprints to the storage. By doing so, network data units (e.g., packets) that only use a fraction of the supported payload size may be reduced, thereby improving network communication efficiency.

At operation 308, a first portion of the chunks corresponding to a first portion of the fingerprints that are new are provided to the storage.

In an embodiment, the first portion of the chunks are provided by receiving, from the storage, a listing indicating that the first portion of the fingerprints are new. In other words, the storage may determined whether any of the fingerprints of a batch are new (e.g., no chunk stored in the storage has the same fingerprint). The first portion of the chunks may be provided by sending them to the storage.

In an embodiment, the first portion of the chunks are provided by determining which fingerprints from the batch are new using a fingerprint cache hosted by the NIC and/or the host data processing system. For example, the NIC or data processing system may maintain the fingerprint cache rather than the storage.

At operation 310, the chunks are discarded without providing, to the storage, a second portion of the chunks that correspond to a second portion of the fingerprints that are not new. For example, after providing the chunks in operation 308, the NIC may discard all of the chunks (e.g., immediately, after a period of time, or after receiving a request for some of the chunks responsive to a provided batch of fingerprints is received by the NIC). The chunks may be discarded by deleting them, deallocating memory associated with them, etc.

The method may end following operation 310.

Using the method illustrated in FIG. 3A, a system in accordance with an embodiment may facilitate deduplicated storage of data without imposing the load for generating fingerprints on a storage or the communication load for transmitting duplicative chunks to the storage.

Turning to FIG. 3B, a flow diagram illustrating a method of storing data in accordance with an embodiment is shown. The method may be performed by a NIC, a data processing system, a storage, and/or other components.

At operation 320, a batch of fingerprints are obtained from a NIC. The batch of fingerprints may include fingerprints that may be duplicative of fingerprints of chunks stored in the NIC.

At operation 322, requests for chunks corresponding to the fingerprints of the batch of fingerprints that are new are obtained. The requests may be obtained by comparing the fingerprints from the batch to a fingerprint cache in which fingerprints of stored chunks are stored. The comparison may indicate which of the fingerprints of the batch are new and which of the fingerprints of the batch that are not new (e.g., duplicative of fingerprints in the cache). The requests may be obtained by populating requests with identifiers of the fingerprints of the batch that are new.

At operation 324, the requests for the chunks are provided to the NIC in batches. For example, the requests may be provided in a single batch that is responsive to the batch of fingerprints.

At operation 326, the corresponding chunks are obtained from the NIC. The NIC may provide the corresponding chunks based on the identifiers included in the requests of operation 324.

At operation 328, the obtained corresponding chunks are stored. The may be stored via any process and in any format (e.g., in containerized storages, bulk storages, structured with a file system, etc.).

The fingerprints for each of the corresponding chunks may also be stored in the fingerprint cache. Reference counts for each of the corresponding chunks may also be established (e.g., set to one, to indicate that only one piece of stored data relies on the corresponding chunks for reconstruction).

At operation 330, reference counts for each of the fingerprints that are not new are updated. The reference counts may be updated by incrementing them to indicate that an additional data structure which relies on the chunk corresponding to the fingerprints that are not new has been stored in the storage.

The method may end following operation 330.

Using the method illustrated in FIG. 3B, storages may store deduplicated data without needing to generate fingerprints or receive copies of duplicative chunks of data thereby reducing network traffic.

Figure 4:
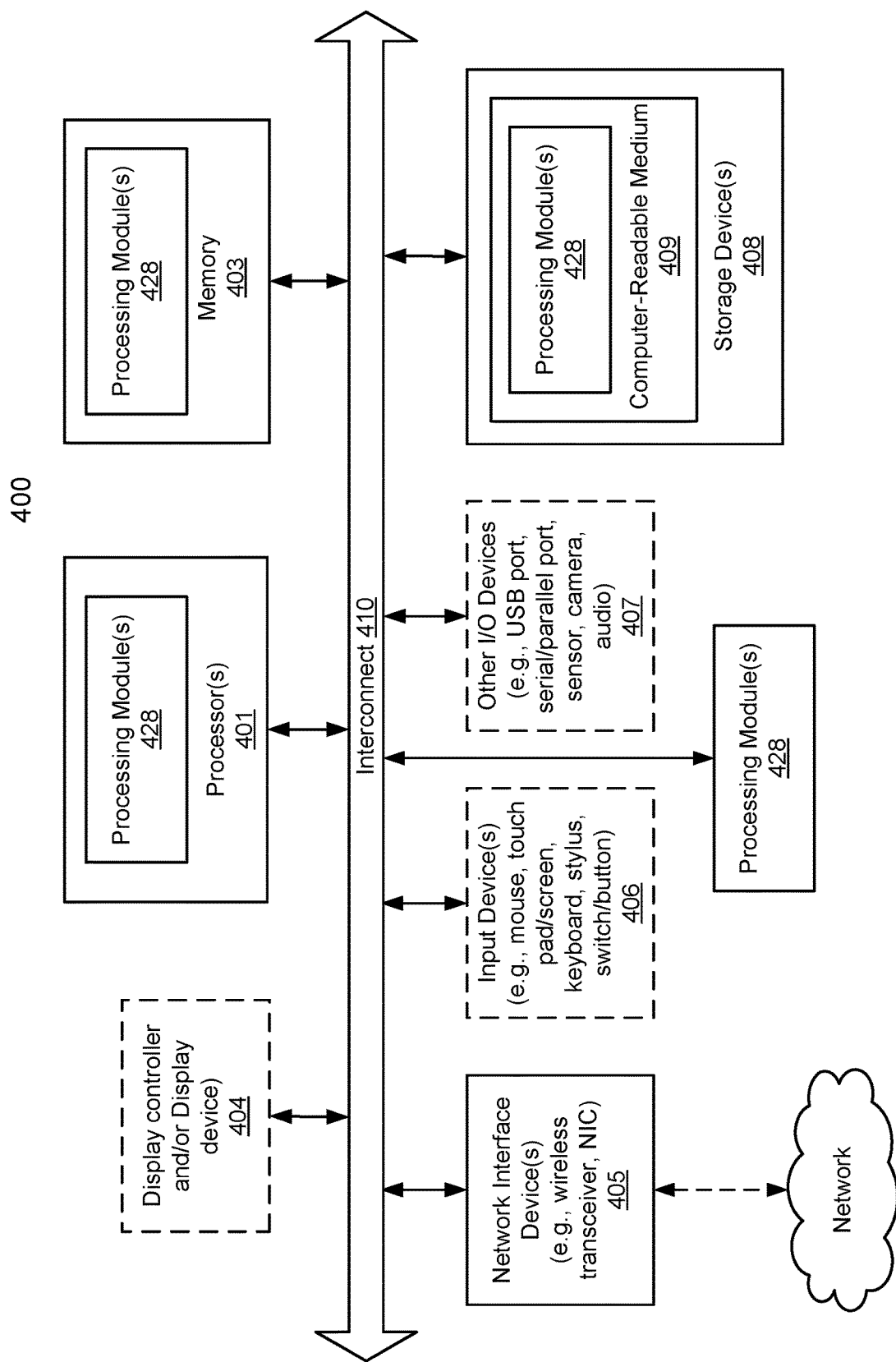
FIG. 4 shows a block diagram illustrating a data processing system in accordance with an embodiment.

Any of the components illustrated in FIGS. 1-2 may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-408 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments as described herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A computer-implemented method for managing data storage in a distributed system, the method comprising:
   obtaining, by a Network Interface Controller (NIC) of a data processing system, data for storage;
   segmenting, by the NIC, the data into chunks;
   obtaining, by the NIC, fingerprints for the chunks;
   providing, by the NIC, batches of the fingerprints to a storage;
   after providing the batches of the fingerprints to the storage, providing, by the NIC and to the storage for storage, a first portion of the chunks corresponding to a first portion of the fingerprints that are new, wherein the first portion of the chunks are provided to the storage in response to receiving instructions from the storage for the first portion of the chunks; and
   discarding, by the NIC and based on the instructions from the storage, the chunks without providing to the storage a second portion of the chunks corresponding to a second portion of the fingerprints that are not new.

2. The computer-implemented method of claim 1, wherein the storage is operably connected to the NIC via a network, and the data is obtained from compute resources of the data processing system via a bus of the data processing system.

3. The computer-implemented method of claim 2, further comprising:
   presenting an emulated storage device to the compute resources,
   wherein the data is obtained via communication over the bus, the communication being directed to the emulated storage device.

4. The computer-implemented method of claim 3, wherein the compute resources believe that the data is stored in a storage directly connected to the bus.

5. The computer-implemented method of claim 2, further comprising:

determining communication characteristics of a connection between the NIC and the storage via the network; and
identifying a batch size based on the communication characteristics,
wherein providing the batches comprises:
obtaining a batch of the batches based on the identified batch size.

6. The computer-implemented method of claim 5, wherein obtaining the batch comprises:
adding a portion of the fingerprints to the batch so that the batch has a size substantially similar to the identified batch size.

7. The computer-implemented method of claim 1, wherein obtaining the fingerprints comprises:
obtaining hashes for the chunks, the hashes being used as the fingerprints, and a hash function used to obtain the hashes being substantially collision free.

8. The computer-implemented method of claim 7, wherein obtaining the hashes for the chunks comprises:
sending the chunks to a communication security processor of the NIC; and
receiving the hashes from the communication security processor.

9. The computer-implemented method of claim 1, wherein providing the first portion of the chunks comprises, by the NIC:
receiving, from the storage and in response to the NIC providing the batches of the fingerprints to a storage, the instructions from the storage for the first portion of the chunks, wherein the instructions include a list specifying the first portion of the fingerprints that are new; and
using the list to select the first portion of the chunks.

10. The computer-implemented method of claim 1, wherein the instructions are received from the storage in a response batch that is responsive to a batch of the batches of the fingerprints provided to the storage, and wherein the storage is a network storage device that is remotely connected to the NIC via a network.

11. A non-transitory machine-readable medium having instructions stored therein, which when executed by a processor, cause the processor to perform operations for managing storage of data in a distributed system, the operations comprising:
obtaining, by a Network Interface Controller (NIC) of a data processing system, data for storage;
segmenting, by the NIC, the data into chunks;
obtaining, by the NIC, fingerprints for the chunks;
providing, by the NIC, batches of the fingerprints to a storage;
after providing the batches of the fingerprints to the storage, providing, by the NIC and to the storage for storage, a first portion of the chunks corresponding to a first portion of the fingerprints that are new, wherein the first portion of the chunks are provided to the storage in response to receiving instructions from the storage for the first portion of the chunks; and
discarding, by the NIC and based on the instructions from the storage, the chunks without providing to the storage a second portion of the chunks corresponding to a second portion of the fingerprints that are not new.

12. The non-transitory machine-readable medium of claim 11, wherein the storage is operably connected to the NIC via a network, and the data is obtained from compute resources of the data processing system via a bus of the data processing system.

13. The non-transitory machine-readable medium of claim 12, wherein the operations further comprise:
presenting an emulated storage device to the compute resources,
wherein the data is obtained via communication over the bus, the communication being directed to the emulated storage device.

14. The non-transitory machine-readable medium of claim 13, wherein the compute resources believe that the data is stored in a storage directly connected to the bus.

15. The non-transitory machine-readable medium of claim 12, wherein the operations further comprise:
determining communication characteristics of a connection between the NIC and the storage via the network; and
identifying a batch size based on the communication characteristics,
wherein providing the batches comprises:
obtaining a batch of the batches based on the identified batch size.

16. A data processing system, comprising:
compute resources; and
a Network Interface controller (NIC), comprising:
a processor, and
a memory coupled to the processor to store instructions, which when executed by the processor, cause the processor to perform operations for managing storage of data in a distributed system, the operations comprising:
obtaining data for storage;
segmenting the data into chunks;
obtaining fingerprints for the chunks;
providing batches of the fingerprints to a storage;
after providing the batches of the fingerprints to the storage, providing, to the storage for storage, a first portion of the chunks corresponding to a first portion of the fingerprints that are new, wherein the first portion of the chunks are provided to the storage in response to receiving instructions from the storage for the first portion of the chunks; and
discarding, based on the instructions from the storage, the chunks without providing to the storage a second portion of the chunks corresponding to a second portion of the fingerprints that are not new.

17. The data processing system of claim 16, wherein the storage is operably connected to the NIC via a network, and the data is obtained from the compute resources via a bus of the data processing system.

18. The data processing system of claim 17, wherein the operations further comprise:
presenting an emulated storage device to the compute resources,
wherein the data is obtained via communication over the bus, the communication being directed to the emulated storage device.

19. The data processing system of claim 18, wherein the compute resources believe that the data is stored in a storage directly connected to the bus.

20. The data processing system of claim 17, wherein the operations further comprise:
determining communication characteristics of a connection between the NIC and the storage via the network; and
identifying a batch size based on the communication characteristics, wherein providing the batches comprises:
   obtaining a batch of the batches based on the identified batch size.

* * * * *